May 26, 1953 — L. D. GRAHAM — 2,639,870

LINE SPOOLING DEVICE FOR FISHING REELS

Filed March 3, 1950 — 2 Sheets-Sheet 1

INVENTOR.
LEONARD D. GRAHAM,
BY
ATTORNEY.

May 26, 1953    L. D. GRAHAM    2,639,870
LINE SPOOLING DEVICE FOR FISHING REELS

Filed March 3, 1950    2 Sheets-Sheet 2

INVENTOR.
LEONARD D. GRAHAM,
BY
ATTORNEY.

Patented May 26, 1953

2,639,870

UNITED STATES PATENT OFFICE 2,639,870

LINE SPOOLING DEVICE FOR FISHING REELS

Leonard D. Graham, Lynwood, Calif.

Application March 3, 1950, Serial No. 147,506

2 Claims. (Cl. 242—84.4)

This invention relates to a line spooling device for fishing reels whereby a fishing line is evenly distributed on the reel as the line is wound thereon.

An object of my invention is to provide a novel line spooling device of the character stated, which can be quickly and easily disconnected from the line and moved out of the path of the fishing line when desired, and particularly when the fisherman is casting, that is, when the line is unspooling.

A feature of my invention resides in a means to rotate the line spooling finger out of the path of the fishing line so that this finger will not hinder the unreeling of the fishing line from the spool.

Another object of my invention is to provide a novel line spooling device of the character stated, including a means to rotate the spooling finger out of the path of the fishing line and this same means actuating a clutch to release the spool so that this spool can freely rotate when the fisherman is casting.

Still another object of my invention is to provide a line spooling device of the character stated, which is simple in construction, effective in operation, and inexpensive to manufacture.

Other objects, advantages and features of invention may appear from the accompanying drawing, the subjoined detailed description and the appended claims.

In the drawing—

Figure 1:
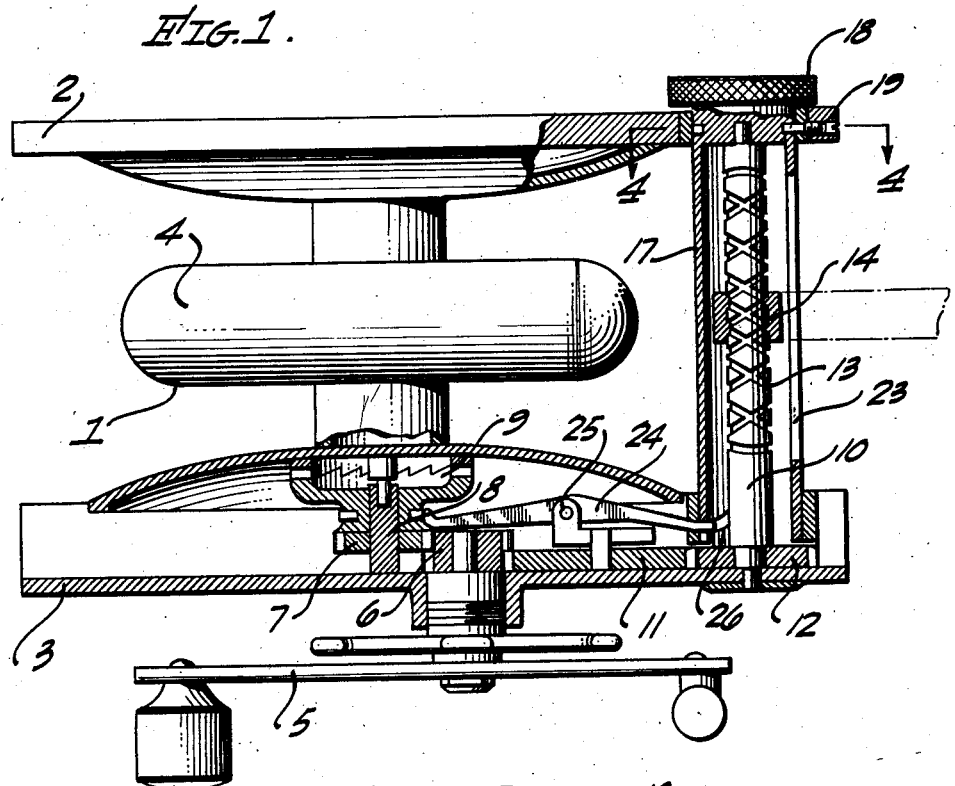
Figure 1 is a top plan view of a fishing reel embodying my invention, and with parts thereof broken away to show the interior construction.

Referring more particularly to the drawing, the fishing reel 1 includes the side plates 2—3, between which the spool 4 is rotatably mounted. The spool 4 is rotated through a gear train by the handle 5, all of which is usual and well known in the art.

Figure 2:
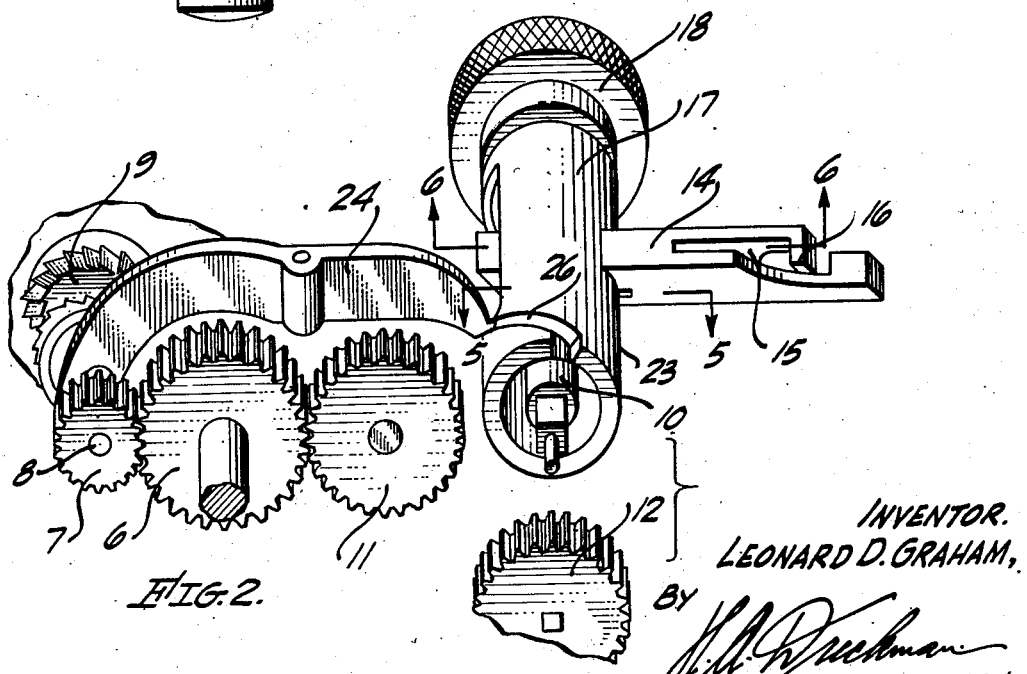
Figure 2 is a perspective view of the gear train and the line spooling device.

The gear train from the handle 5 includes the meshing gears 6—7, which are best shown in Figure 2. The gear 7 is slidable on a trunnion 8, and this gear also includes a clutch 9, preferably of the toothed type, all of which again is usual and well known in the art.

A line spooling shaft 10 is journalled in the frame members 2—3, and this shaft is rotated by the handle 5 and from the gear 6 by the gear train 11—12. Again, this method of driving the spooling shaft 10 is usual and well known in the art.

The shaft 10 is formed with an endless thread 13, and a finger 14, engages these threads and is moved from side to side of the fishing reel and, therefore, lengthwise of the shaft 10, as this shaft is rotated. When the fishing line engages the finger 14, this line will be moved from side to side of the spool 4, and thus will wind evenly on the spool, all of which will be evident.

Figure 3:
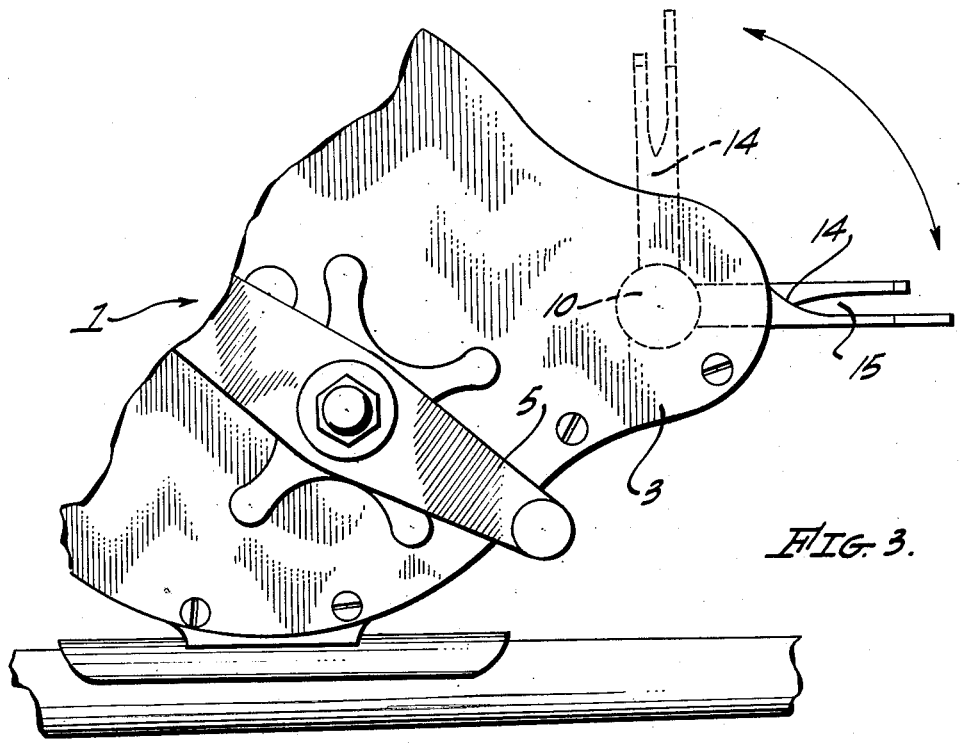
Figure 3 is a fragmentary side elevation of a fishing reel embodying my invention.

The finger 14 is provided with a longitudinal slot 15, and a lip 16 extending over this slot so that the fishing line can be quickly and easily dropped into the slot 15, when the finger 14 is in spooling position, shown in dotted lines in Figure 3. The solid line position of the finger 14, in Figure 3, is the position employed when the fishing line is not being spooled.

The method of moving the finger 14 from operative to inoperative position is as follows:

A sleeve 17 surrounds the shaft 10 and is concentric therewith. The sleeve 17 is journalled in the side plates 2—3 of the fishing reel and is manually rotatable by means of the knurled knob 18, at one end of the sleeve.

To limit the rotative movement of the sleeve 17, I provide a pin 19 and a pair of spaced stop pins 20—21, which extend upwardly from the sleeve 17. Also, a spring detent 22 yieldably holds the sleeve 17 in the position of operation of the finger 14, that is, where the fishing line is being spooled on the reel. The sleeve 17 is formed with a slot 23, through which the finger 14 projects, thus permitting the finger to oscillate and still enable the sleeve to tilt the finger from operative to inoperative position.

Figures 4, 5:
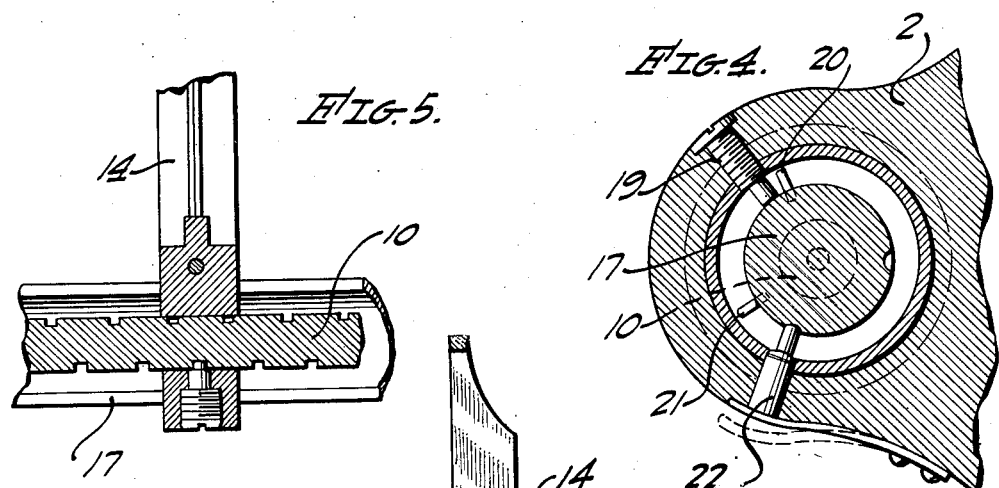
Figure 4 is an enlarged fragmentary sectional view taken on line 4—4 of Figure 1.
Figure 5 is an enlarged fragmentary sectional view taken on line 5—5 of Figure 2.
Figure 6:
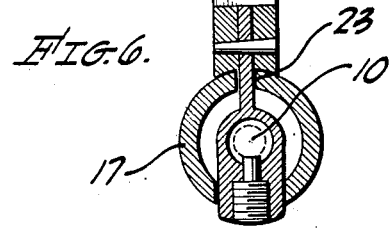
Figure 6 is a sectional view taken on line 6—6 of Figure 2.

In Figures 5 and 6 the finger 14 has a base projection which also extends through the sleeve 17, and this construction may also be employed, or the bottom of the finger 14 may be within the sleeve, as shown in Figure 1.

A clutch arm 24 is pivotally mounted, as shown at 25, and one end of the clutch arm engages the clutch 9, while the other end thereof enters a cam slot 26, in the sleeve 17. Thus, as the sleeve 17 rotates to move the finger 14 into inoperative position, the clutch arm 24 still simultaneously disengages the clutch 9 and thus permits the spool 4 to move freely, which is desirable in casting. As soon as the arm 14 is again moved into operative or spooling position, the clutch 9 will be re-engaged and then the spool 4 will be geared to the handle 5 and rotated thereby.

It will thus be evident that I can move the spooling finger 14 from substantially vertical position where spooling action occurs, to a substantially horizontal position and where the finger is out of the path of the fishing line, as during casting operations. This movement of the spooling finger is manually controlled by means of the sleeve 17 and rotation of this sleeve also engages or disengages a clutch on the spool of the reel.

Having described my invention, I claim:

1. In combination with a fishing reel including a spool, a clutch engageable with the spool, an operating handle, and drive means extending from the handle to the clutch of a line spooling device comprising a shaft, side plates in which the shaft is journaled, drive means extending from the first named drive means to the shaft, a finger reciprocally and rotatably mounted on said shaft, a sleeve journaled in the side plates and surrounding said shaft, said sleeve having an elongated slot therein through which said finger extends, said sleeve projecting through one of the side plates, a knob affixed to the projecting end of the sleeve, whereby said sleeve is rotated to move the finger from operative to inoperative position, a clutch arm, one end of said clutch arm being operatively attached to said clutch and the other end of said clutch arm being operatively attached to said sleeve, whereby said clutch is actuated on rotation of said sleeve.

2. In combination with a fishing reel including a spool, a clutch engageable with the spool, an operating handle, and drive means extending from the handle to the clutch of a line spooling device comprising a shaft, side plates in which the shaft is journaled, drive means extending from the first named drive means to the shaft, a finger reciprocally and rotatably mounted on said shaft, a sleeve journaled in the side plates and surrounding said shaft, said sleeve having an elongated slot therein through which said finger extends, said sleeve projecting through one of the side plates, a knob affixed to the projecting end of the sleeve, whereby said sleeve is rotated to move the finger from operative to inoperative position, a clutch arm pivotally mounted on one of the side plates, one end of said clutch arm engaging said clutch on the spool, said sleeve having a cam slot therein into which one end of the clutch arm extends, whereby rotation of said sleeve will actuate the clutch on the spool.

LEONARD D. GRAHAM.

References Cited in the file of this patent

UNITED STATES PATENTS

| Number | Name | Date |
|---|---|---|
| 522,323 | Freese | July 3, 1894 |
| 783,842 | Kramer | Feb. 28, 1905 |
| 817,987 | Richardson | Apr. 17, 1906 |
| 833,842 | Marhoff | Oct. 23, 1906 |
| 1,345,072 | Case | June 29, 1920 |
| 1,964,965 | Smelser | July 3, 1934 |
| 2,310,654 | Sanborn | Feb. 9, 1943 |